United States Patent
Utermoehlen et al.

(10) Patent No.: US 10,866,121 B2
(45) Date of Patent: Dec. 15, 2020

(54) ROTATIONAL ANGLE SENSOR

(71) Applicant: Robert Bosch GmbH, Stuttgart (DE)

(72) Inventors: Fabian Utermoehlen, Lippstadt (DE); Andreas Merz, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 16/079,897

(22) PCT Filed: Feb. 24, 2017

(86) PCT No.: PCT/EP2017/054282
§ 371 (c)(1),
(2) Date: Aug. 24, 2018

(87) PCT Pub. No.: WO2017/144640
PCT Pub. Date: Aug. 31, 2017

(65) Prior Publication Data
US 2019/0072414 A1 Mar. 7, 2019

(30) Foreign Application Priority Data
Feb. 24, 2016 (DE) .................. 10 2016 202 859

(51) Int. Cl.
*G01D 5/20* (2006.01)
*G01D 5/244* (2006.01)
(Continued)

(52) U.S. Cl.
CPC ............ *G01D 5/2053* (2013.01); *G01D 5/208* (2013.01); *G01D 5/24438* (2013.01); *H02K 3/28* (2013.01); *G01B 7/30* (2013.01); *H01F 5/04* (2013.01)

(58) Field of Classification Search
CPC .............................. G01D 5/2053; G01D 5/206
See application file for complete search history.

(56) References Cited

U.S. PATENT DOCUMENTS 6,534,970 B1   3/2003   Ely et al.
6,628,038 B1 *  9/2003   Shikayama .............. G01B 7/30
                                                   310/268

(Continued)

FOREIGN PATENT DOCUMENTS

DE     197 38 836 A1   3/1999
DE     698 10 504 T2   11/2003
(Continued)

OTHER PUBLICATIONS

International Search Report corresponding to PCT Application No. PCT/EP2017/054282, dated May 22, 2017 (German and English language document) (5 pages).

*Primary Examiner* — Noam Reisner
(74) *Attorney, Agent, or Firm* — Maginot, Moore & Beck LLP (57) ABSTRACT

A rotational angle sensor includes a stator element and a rotor element. The stator element has a stator transmitting coil, a stator circuit board with first and second planes, and at least two identically configured stator receiving coils arranged within the stator transmitting coil on the stator circuit board angularly offset from each other. The rotor element is mounted rotatably about a rotational axis relative to the stator element. The stator transmitting coil is inductively coupled to the stator receiving coils via the rotor element such that the inductive coupling is configured with reference to a rotational angle between the stator element and the rotor element so that the stator transmitting coil induces at least two angle-dependent alternating voltages in the stator receiving coils. The stator transmitting coil has coil conducting tracks positioned on the first and second planes of the stator circuit board. The coil conducting tracks on the first plane are interrupted in a passage region, and are connected to diverting tracks on the second plane by vias. The stator receiving coils have connection conductors on the (Continued)

first plane lead from stator receiving coil connections within the stator transmitting coil, through the passage region, and to circuit board connections for the stator receiving coils. Each connection conductor is curved so as to form a conductor loop in order to compensate differently sized coil areas of the stator receiving coils formed by connection conductors of different lengths within the stator transmitting coil.

10 Claims, 7 Drawing Sheets

(51) Int. Cl.
*H02K 3/28* (2006.01)
*G01B 7/30* (2006.01)
*H01F 5/04* (2006.01)

(56) References Cited

U.S. PATENT DOCUMENTS

| | | | | |
|---|---|---|---|---|
| 2010/0117631 A1* | 5/2010 | Inoue | ............ | H02K 24/00 |
| | | | | 324/207.24 |
| 2013/0069637 A1* | 3/2013 | Kobayashi | ............ | G01D 5/208 |
| | | | | 324/207.17 |
| 2014/0225600 A1 | 8/2014 | Fontanet et al. | | |

FOREIGN PATENT DOCUMENTS

| | | |
|---|---|---|
| EP | 0 909 955 B1 | 4/1999 |
| EP | 2 570 776 A2 | 3/2013 |

* cited by examiner

ROTATIONAL ANGLE SENSOR

This application is a 35 U.S.C. § 371 National Stage Application of PCT/EP2017/054282, filed on Feb. 24, 2017, which claims the benefit of priority to Serial No. DE 10 2016 202 859.6, filed on Feb. 24, 2016 in Germany, the disclosures of which are incorporated herein by reference in their entirety.

FIELD OF THE INVENTION

The disclosure relates to a rotational angle sensor which can be used to determine, for example, a rotational angle between a shaft and a further component.

BACKGROUND

In order to measure rotational angles, rotational angle sensors are known, for example, in which a magnet is rotated over a corresponding magnetic field sensor. The measurement of the magnetic field vector then allows the rotational angle to be deduced. Such sensors also react to external magnetic fields, which are caused for example by a current flowing through power cables arranged alongside, and can be very sensitive to interference.

Another type of rotational angle sensor uses an Eddy current effect. In this case, for example, a metallic target is moved over sensor coils, which are supplied with an AC voltage and induce an Eddy current in the target. This results in a reduction of the inductances of the sensor coils and allows the rotational angle to be deduced from a change in frequency. By way of example, the coils form part of a resonant circuit, the resonant frequency of which shifts when there is a change in the inductance. However, this type of rotational angle sensor can have a high cross sensitivity to installation tolerances (especially tilting of the target). The frequency generated can also be disturbed by external electromagnetic fields (injection locking), since frequencies in the range of a few tens of MHz are usually employed.

EP 0 909 955 331 discloses a rotational angle sensor comprising planar conductor loops which are short-circuited on a target and interact with the alternating electromagnetic field of an excitation coil.

SUMMARY

Embodiments of the present disclosure can advantageously make it possible to provide a rotational angle sensor which is particularly economic to produce, wherein said rotational angle sensor yields measurement signals that are simple to evaluate.

Ideas relating to embodiments of the present disclosure can be considered to be based, inter alia, on the concepts and insights described below.

The disclosure relates to a rotational angle sensor which can be used in particular in an environment with high electromagnetic interference fields. By way of example, the rotational angle sensor can be used in the engine compartment or in the vicinity of the engine compartment of a vehicle, for example for determining a position of a throttle valve, a rotor position of a BLDC motor, a position of a gas pedal or a position of a camshaft. The rotational angle sensor described below is cost-effective, requires little installation space and is based on a simple measurement principle.

In accordance with one embodiment of the disclosure, the rotational angle sensor comprises a stator element having a stator transmitting coil and at least two identically constructed stator receiving coils, which are angularly offset with respect to one another and are arranged on a stator printed circuit board and within the stator transmitting coil, and a rotor element, which is mounted rotatably about an axis of rotation with respect to the stator element and via which the stator transmitting coil is inductively coupled to the at least two stator receiving coils, such that the inductive coupling is dependent on a rotational angle between the stator element and the rotor element and the stator transmitting coil induces at least two angle-dependent AC voltages in the at least two stator receiving coils.

An AC voltage can be applied to the stator transmitting coil, such that, an angle-dependent AC voltage, which is dependent on a rotational angle between the rotor element and the stator element, is in each case induced in the at least two stator receiving coils. To that end, the inductive coupling between the stator transmitting coil and/or the at least two stator receiving coils and the rotor element is dependent on the rotational angle. This can be achieved for example by virtue of the fact that the rotor element has metallic induction elements which are rotatable with the rotor element and which can partly cover the stator receiving coils. Moreover, it is possible for further coils to be arranged on the rotor element, which further coils couple to the stator transmitting coil and/or the at least two stator receiving coils.

In particular, the amplitude of the respective induced AC voltage can be dependent on the rotational angle. The respective induced AC voltage or its amplitude can be regarded as a measurement signal of the rotational angle sensor, which measurement signal is provided by the respective stator receiving coil.

By way of example, a sinusoidal voltage (for example having a frequency of 5 MHz and an amplitude of 1.5 V) can be fed into the stator transmitting coil. By means of a specific layout, of the stator receiving coils (right- and left-handed partial windings having identically sized circumferential areas), what can be achieved is that, without, a rotor element no voltage is induced in the stator receiving coils. The coupling factor (amplitude ratio of the voltage in the stator receiving coil and the voltage in a stator transmitting coil) is zero. This symmetry is broken by the presence of the rotor element and coupling factors in the range of −0.3 to +0.3 arise. The latter are measured and allow the angular position of the rotor element to be deduced.

In this case, a coil can be defined by a plurality of conductor tracks in or on the printed circuit board, which are all connected in series and which can be jointly energized via connections on the printed circuit board.

In accordance with one embodiment of the disclosure, the stator transmitting coil has coil conductor tracks in a first plane and a second plane of the stator printed circuit board, wherein the coil conductor tracks in a first plane of the stator printed circuit board are interrupted in a passage region and are connected to diverting tracks on the second plane via plated-through holes. The coil conductor tracks of the stator transmitting coil can be substantially circular at least in sections, wherein the midpoint of the circles defining the conductor tracks can substantially correspond to an axis of symmetry of the stator element. Said axis of symmetry can be an axis which corresponds to the axis of rotation of the rotor element given exact alignment of the stator element with the rotor element.

The two planes of the stator printed circuit board can be the two sides of the stator printed circuit board. It should be understood that the stator printed circuit board can, however, also have farther planes (that is to say can be a multilayered printed circuit board), in which other conductor tracks of the rotational angle sensor (for example those of an evaluation unit for evaluating the measurement signal) can be formed.

The passage region can be a region in the circumferential direction of the stator transmitting coil which has an aperture angle of less than 90°, for example less than 45°. In the passage region, no conductor tracks of the stator transmitting coil extend in the first plane. Rather, the coil conductor tracks, as viewed in the circumferential direction, are led outside the passage region (that is to say at the two sides of the passage region) to plated-through holes, where they are diverted into the second plane. Diverting tracks are situated in the second plane, which diverting tracks can extend substantially parallel to the coil conductor tracks of the stator transmitting coil and connect the plated-through holes for coil conductor tracks on different sides of the passage region. The diverting tracks and/or the plated-through holes can be arranged in the outer region of a ring-shaped region in which the stator receiving coils are arranged. The diverting tracks can extend at least in sections substantially parallel to the coil conductor tracks in the second plane.

The passage region creates an opening in the stator transmitting coil, through which connection conductors for the at least two stator receiving coils can be led out of the interior of the stator transmitting coil e.g. in a radial direction.

In accordance with one embodiment of the disclosure, in the first plane, connection conductors of the stator receiving coils are led from stator receiving coil connections within the stator transmitting coil through the passage region to printed circuit board connections for the stator receiving coils. It should be understood that the coil conductor tracks of the stator transmitting coil can be arranged in a ring-shaped region around the axis of symmetry. The region as viewed radially within said ring-shaped region can be regarded as an inner region of the stator transmitting coil. The stator receiving coils and their connections can be situated in the inner region, i.e. within the stator transmitting coil. The region as viewed radially outside the ring-shaped region can be regarded as an outer region of the stator transmitting coil. The printed circuit board connections can be arranged in the outer region, i.e. outside the stator transmitting coil.

Overall, it is possible in this way to arrange the stator transmitting coil and the stator receiving coils in only two planes of the stator printed circuit board. Particularly cost-effective manufacture of the stator element is thus possible.

In accordance with one embodiment of the disclosure, a connection conductor of a stator receiving coil is curved to form a conductor loop in order to compensate for differently sized coil areas of the stator receiving coils that are produced by connection conductors of different lengths within the stator transmitting coil.

In order to obtain measurement signals that are as identical as possible, the stator receiving coils should be constructed as identically as possible. Since the passage region should be as narrow as possible, at least in the case of one of the stator receiving coils the connection conductors are led within the stator transmitting coil to the passage region, which results in an additional coil area for said stator receiving coil. This also has the consequence that said stator receiving coil would couple (via the rotor element) more strongly to the stator transmitting coil. For this reason, a further conductor loop connected to said stator receiving coil is provided, which further conductor loop couples to the stator transmitting coil in such a way that the additional coil area caused by the connection conductors is compensated for again.

In principle, the field of the transmitting coil in the interior thereof is opposite to the field outside and has a larger absolute value. In order thus to compensate for an induced voltage in the interior, a significantly larger area is needed on the outside.

In other words, the current induced fay the conductor loop should be equal in magnitude, in terms of the amplitude, to the current induced in the additional coil area (or in the connection conductor), and merely have a different sign.

In this case, the conductor loop can be arranged at least partly outside the stator transmitting coil where the stator transmitting coil generates an electromagnetic field that is opposite to the field within the stator transmitting coil.

In this case, a conductor loop can be configured as one or more conductor tracks on the stator printed circuit board which span coil areas together with other conductor tracks of the same coil (i.e. of the stator receiving coil in this case).

In accordance with one embodiment of the disclosure, the conductor loop is formed by a connection conductor which extends toward the passage region in a circumferential direction within the stator transmitting coil and which extends in an opposite direction outside the stator transmitting coil. In principle, the stator receiving coil can be connected to the printed circuit board connections via two connection conductors. Within the stator transmitting coil, the two connection conductors can extend from a stator receiving coil connection in a first circumferential direction to the passage region and then follow different paths outside the stator transmitting coil, i.e. move away from one another outside the stator transmitting coil. The first connection conductor can be curved to form the conductor loop, which extends at least in sections in a second circumferential direction opposite to the first circumferential direction. In this way, the conductor loop can form a first coil area with the first connection conductor within the stator transmitting coil and a further coil area outside the stator transmitting coil with the second connection conductor, which coil areas together can compensate for an offset voltage generated by the asymmetry of the connection conductors within the stator transmitting coil.

In accordance with one embodiment of the disclosure, the conductor loop, proceeding from the passage region, increases its radial distance with respect to the stator transmitting coil in a first region and decreases its radial distance with respect to the stator transmitting coil in an adjacent second region, by which the conductor loop is connected to a printed circuit board connection. The conductor loop can be realized by virtue of the fact that one of the two connection conductors for the stator receiving coil firstly moves away from the stator transmitting coil (i.e. is at an ever increasing distance from the stator transmitting coil in the radial direction) and subsequently approaches the stator transmitting coil again (i.e. is at a once again decreasing radial distance from the stator transmitting coil). The connection conductor can subsequently extend with increasing radial distance from the stator transmitting coil toward the associated printed circuit board connection.

The other, second connection conductor of the stator receiving coil can also extend outside the stator transmitting coil with increasing radial distance from the stator transmitting coil toward the associated printed circuit board connection.

In accordance with one embodiment of the disclosure, plated-through holes for the diverting tracks are arranged radially within the conductor loop. In particular, half of the plated-through holes on one side of the passage region or at one end of the passage region can be arranged radially within the conductor loop in a circumferential direction. In this case, the passage region has two sides or ends situated opposite one another in a circumferential direction.

In accordance with one embodiment of the disclosure, the two connection conductors of a stator receiving coil extend parallel from the associated stator receiving coil connections through the passage region. In this way, the area which they enclose and which contributes to the area of the respective receiving coil can be kept small.

In accordance with one embodiment of the disclosure, the diverting tracks extend radially outside the coil conductor tracks of the stator transmitting coil in the second plane. The diverting tracks can thus be arranged in the outer region outside the coil conductor tracks, such that the entire inner region is available for the stator receiving coils. As a result, the measurement signal can advantageously be increased since the measurement signal is greater, the more receiving area is present.

In accordance with one embodiment of the disclosure, each of the stator receiving coils has at least two oppositely directed partial windings. In this case, a partial winding can be a part of a coil which comprises conductors which e.g. all extend around the same area and/or which are connected in series with one another. Two partial windings of a coil are oppositely directed or oriented in opposite directions if, in the event of a current flow through the coil, current flows through them respectively in the clockwise direction and in the counterclockwise direction. What can be achieved by means of oppositely directed partial windings having an area of equal size overall is that in the stator receiving coils a current is not induced directly by the stator transmitting coil (but rather only indirectly via the rotor element). Furthermore, a substantially homogeneous electromagnetic interference field cannot induce a current in the stator receiving coil.

In accordance with one embodiment of the disclosure, each of the stator receiving coils is constructed from conductor tracks in two planes of the printed circuit board. In particular, the stator receiving coils can be constructed in the same two planes as the stator transmitting coil.

In accordance with one embodiment of the disclosure, conductor tracks of two stator receiving coils which are arranged in different planes cross one above another. Each of the stator receiving coils can be constructed such that it covers almost completely (for example to the extent of more than 90%) the area in the inner region of the stator transmitting coil. The stator receiving coils can be rotated with respect to one another in order thus to generate different measurement signals. In this case, they can be constructed such that they cross one above another only at crossing points in different planes.

In accordance with one embodiment of the disclosure, the rotor element has a rotor receiving coil and a rotor transmitting coil, which are electrically connected to one another, wherein the rotor receiving coil is inductively coupled to the stator transmitting coil, such that an electromagnetic field generated by the stator transmitting coil induces a current in the rotor receiving coil, said current flowing through the rotor transmitting coil, such that the rotor transmitting coil generates a further electromagnetic field, wherein the at least two stator receiving coils are inductively coupled to the rotor transmitting coil, such that the inductive coupling is dependent on a rotational angle between the stator element and the rotor element, and the further electromagnetic field generated by the rotor transmitting coil induces at least two angle-dependent AC voltages in the at least two stator receiving coils.

In other words, an AC voltage can be applied to the stator transmitting coil, which AC voltage induces a further AC voltage in the rotor receiving coil by means of an inductive coupling of the stator transmitting coil to the rotor receiving coil. The AC voltage generated in the rotor receiving coil generates a current flow in the rotor transmitting coil, which current flow generates a further AC voltage in each case in the stator receiving coil by means of an inductive coupling of the rotor transmitting coil to the stator receiving coils, which further AC voltage can be measured and a relative rotational angle between the stator element and the rotor element can be determined from the measured values of said further AC voltage.

In accordance with one embodiment of the disclosure, the rotor transmitting coil is divided into at least two partial windings which are oriented in opposite directions. In this way, no current or at least only a small current is induced in the rotor transmitting coil by the stator transmitting coil.

In accordance with one embodiment of the disclosure, the partial windings of the rotor transmitting coil are configured in sickle-shaped fashion. Sickle-shaped partial windings can be delimited by arcuate conductor sections having a varying curvature, which are both curved in the same direction. In particular, the arcuate conductor sections can be circular-arc-shaped and/or have different radii. In this way, the amplitude of the AC voltage induced in a stator receiving coil is dependent on the rotational angle by way of a sine function. A sinusoidal signal dependent on the rotational angle can easily be evaluated and converted into the rotational angle.

By way of example, in the case of two stator receiving coils (a two-phase system), the rotational angle can be determined from the quotient of the two signals by means of the arc tangent. In the case of three stator receiving coils (a three-phase system), the rotational angle can be determined by means of a Clarke transformation of the three signals.

BRIEF DESCRIPTION OF THE DRAWINGS

Embodiments of the disclosure are described below with reference to the accompanying drawings, wherein neither the drawings nor the description should be interpreted as restricting the disclosure.

DETAILED DESCRIPTION

Figure 1:
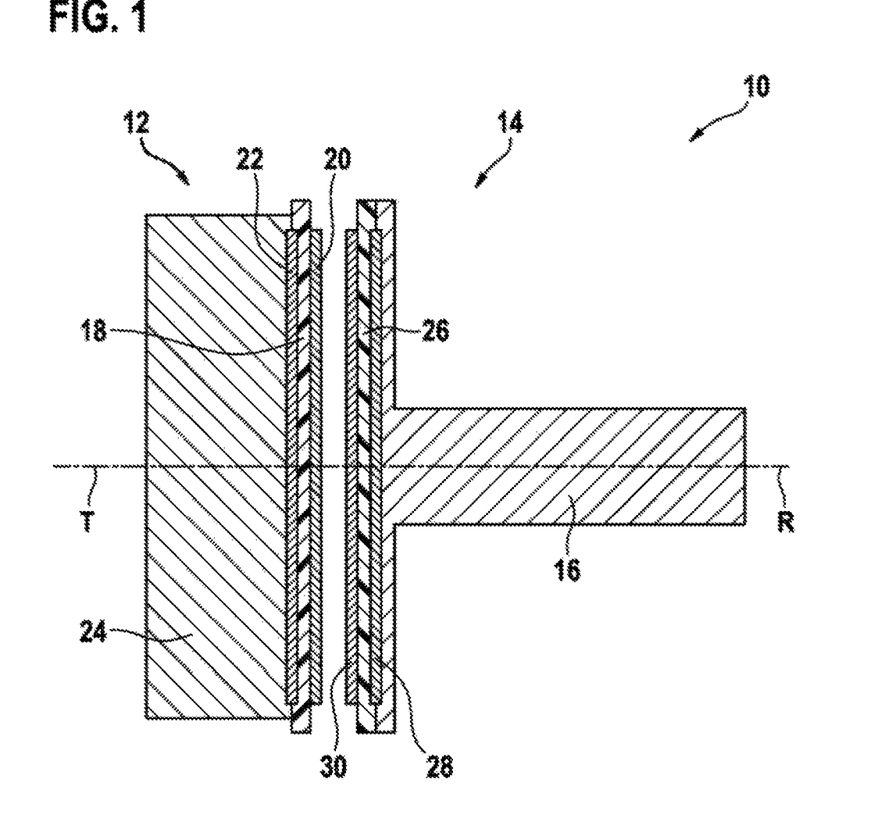
FIG. 1 schematically shows a cross section through a rotational angle sensor in accordance with one embodiment of the disclosure.

FIG. 1 shows a rotational angle sensor 10 composed of a stator element 12 and a rotor element 14. The rotor element 14 can be secured on a shaft 16 of a component, such as, for instance, a throttle valve, a motor, a camshaft, a gas pedal, etc., or can be provided by said shaft 16. The shaft 16 is rotatable about the axis D of rotation and the stator element 12 is situated opposite the rotor element 14 in the corresponding axial direction. By way of example, the stator element 12 is secured to a housing of the component. If the stator element 12 is aligned exactly relative to the shaft 16, the axis T of symmetry of the stator element 12 corresponds to the axis R of rotation.

The stator element 12 comprises a stator printed circuit board 18, on which a stator transmitting coil 20 and a plurality of stator receiving coils 22 are arranged. The conductors of the coils 20, 22 can be arranged just in two planes, for example on the two sides of the stator printed circuit board 18. Further elements for a control unit 24 can be situated on the stator printed circuit board 18. The control unit 24 can supply the stator transmitting coil 20 with an AC voltage (for example having a frequency of between 1 MHz and 20 MHz, for example 5 MHz, and/or having a voltage amplitude in the range of 0.5 V to 10 V, for example 1.5 V) and can determine an induced AC voltage in each stator receiving coil 22. On the basis of these measurements, the control unit 24 can determine a relative rotational angle between the stator element 12 and the rotor element 14.

The rotor element 14 comprises a rotor printed circuit board 26. A rotor receiving coil 28 and a rotor transmitting coil 30 are arranged on the rotor printed circuit board 26. The conductors of the coils 28, 30 can be arranged in just two planes of the rotor printed circuit board 26, for example on the two sides of the rotor printed circuit board 26.

All coils 20, 22, 28, 30 are embodied as planar coils, i.e. as coils which are embodied by means of conductor tracks on and/or in one of the printed, circuit boards 18, 26.

Figure 2:
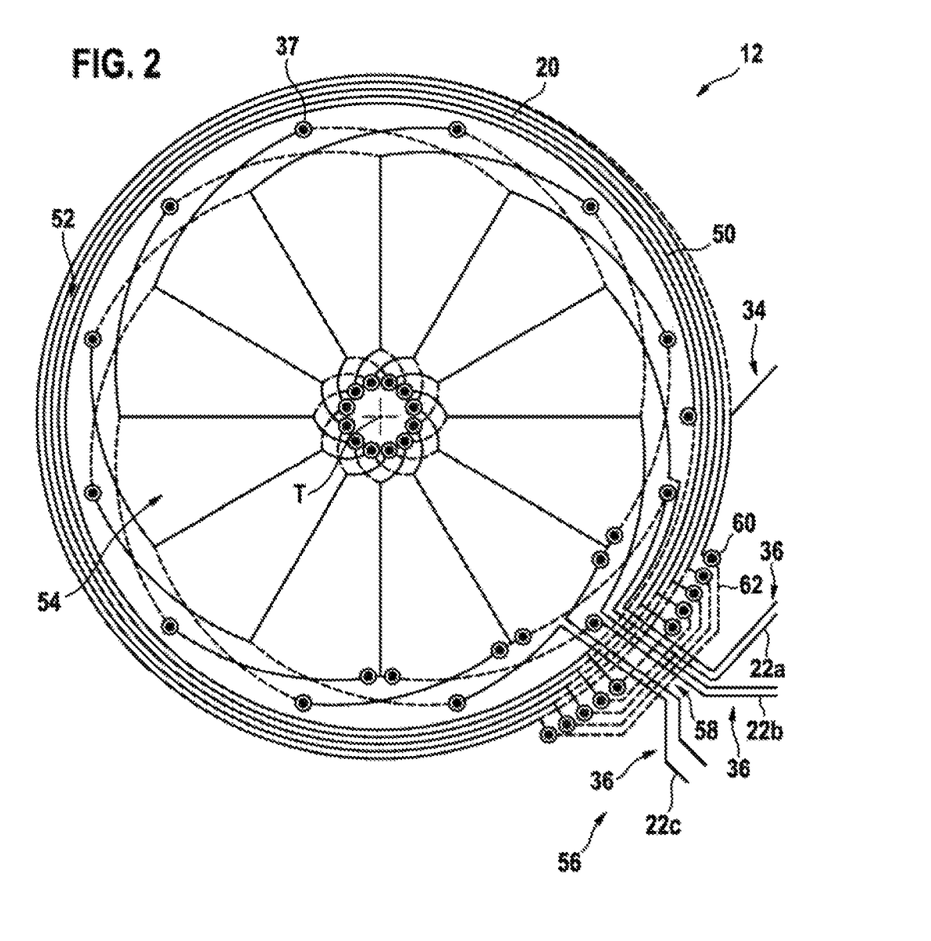
FIG. 2 schematically shows a plan view of a stator element for a rotational angle sensor in accordance with one embodiment of the disclosure.

FIG. 2 shows the coil layout of a stator element 12 in plan view. In FIG. 2 and in the following figures, conductor tracks in a first, plane of a printed circuit board 18, 26 are illustrated in a solid manner and those in a second plane in a dashed manner.

The stator transmitting coil 20 is arranged in a first and second plane of the stator printed circuit board 18 and comprises a plurality of circumferentially extending, almost circular coil conductor tracks 50, which ail extend about the axis T of symmetry, which (given correct alignment of the stator element 12 and the rotor element 14 without an offset) corresponds to the axis R of rotation of the rotational angle sensor. The external diameter of the stator transmitting coil 20 can be between 10 mm and 40 mm, for example 25 mm.

Three stator receiving coils, a first stator receiving coil 22a, a second stator receiving coil 22b and a third stator receiving coil 22c, are arranged within the stator transmitting coil 20, which stator receiving coils are constructed identically (apart from their connections 36) and are rotated by 120° with respect to one another. The stator receiving coils 22a, 22b, 22c are arranged only in the first and the second plane of the stator printed circuit board 18. In this case, they are contacted via connections 36 in the first plane and then extend alternately in the first and second planes, wherein a change of plane is realized by means of a plated-through hole 37. The plated-through hole 37, also referred to as a via, is arranged within the stator transmitting coil 20 as viewed radially.

The coil conductor tracks 50 of the stator transmitting coil are arranged around the axis T of symmetry in a ring-shaped region 52, in the inner region 54 of which the stator receiving coils 22a, 22b, 22c are arranged and in the outer region 56 of which the connections 34, 36 extend. The coil conductor tracks 50 of the stator transmitting coil 20 in the second plane form a spiral. The coil conductor tracks 50 in the first plane are interrupted, such that a passage region 58 is formed in the ring-shaped region 52, through which the connections 36 of the stator receiving coils 22a, 22b, 22c can leave the stator transmitting coil 20. As a result, ail the coils 20, 22a, 22b, 22c can be formed in just two planes of the stator printed circuit board 18.

The conductor tracks 50 of the stator transmitting coil 20 in the first plane, adjacent to the passage region 58, bend outward (in the direction of the outer region 56) and end at plated-through holes 60 in the outer region, which are arranged along a circle around the axis T of symmetry. The plated-through holes 60 on both sides or ends of the passage region 58 (as viewed in the circumferential direction) are connected to one another by means of diverting tracks 62 in the second plane, such that the conductor tracks 50 in the first plane are electrically connected to one another and the stator transmitting coil 20 as viewed electrically is not interrupted.

The diverting tracks 62 and/or the plated-through holes 60 are arranged in the outer region 56 of the ring-shaped region 52. The diverting tracks 62 extend at least in sections substantially parallel to the coil conductor tracks 50 in the second plane.

The region of the stator element 12 in the vicinity of the passage region 58 will be described once again in greater detail with reference to FIGS. 6 and 7.

Figure 3:
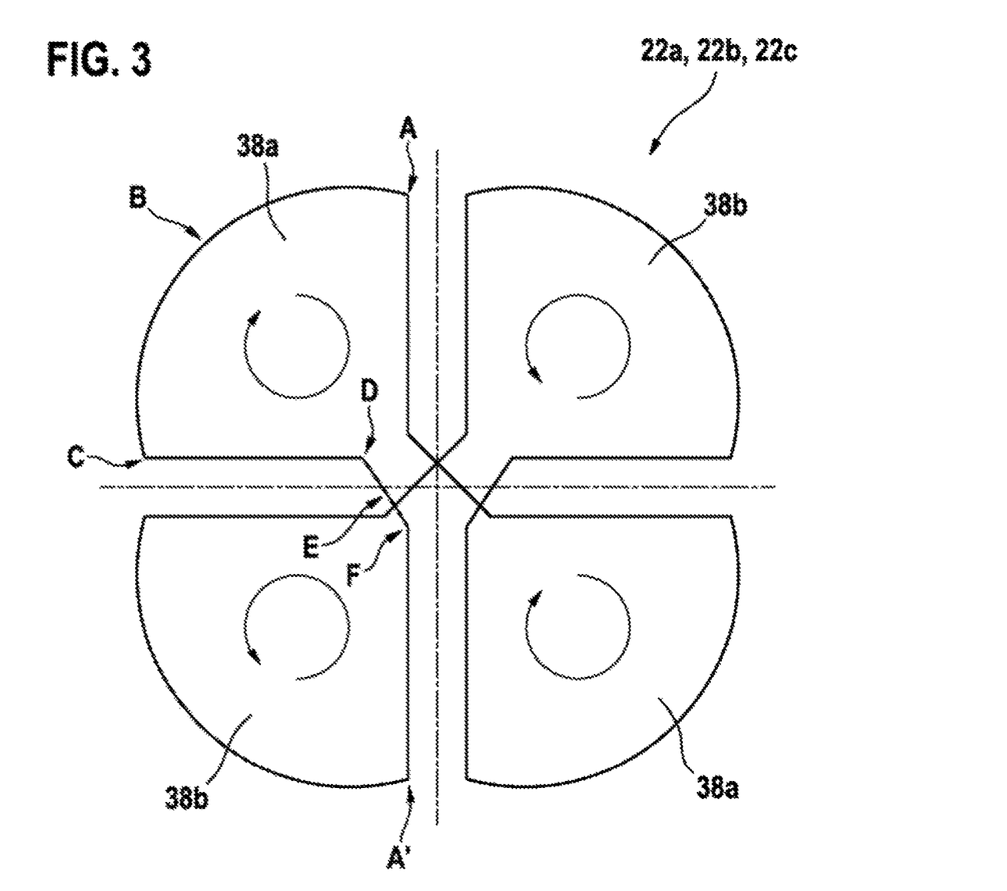
FIG. 3 schematically shows the geometry of a stator receiving coil of a rotational angle sensor in accordance with one embodiment of the disclosure.
Figure 4:
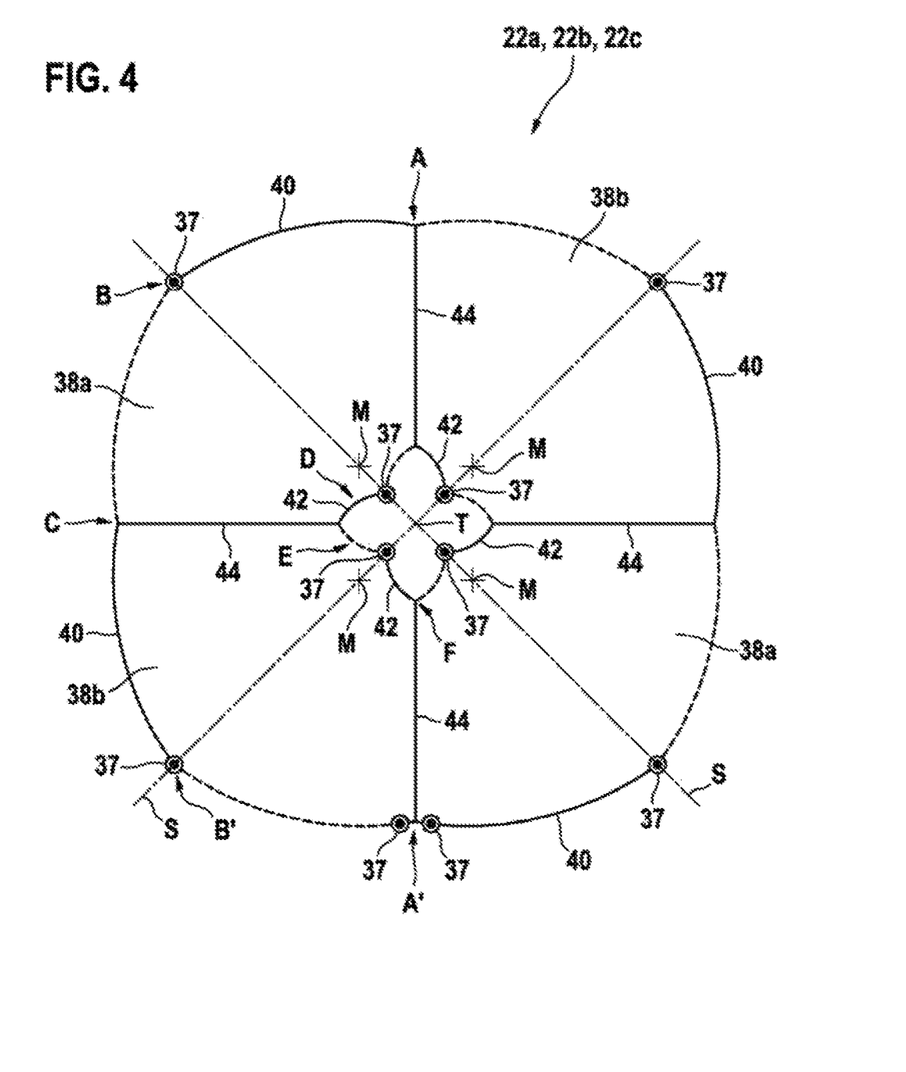
FIG. 4 shows a coil layout for a stator receiving coil of a rotational angle sensor in accordance with one embodiment of the disclosure.

FIG. 3 schematically shows the geometry of an individual one of the three stator receiving coils 22a, 22b, 22c, e.g. the coil layout of the first stator receiving coil 22a, while FIG. 4 shows the coil layout of an individual one of the three stator receiving coils 22a, 22b, 22c.

The connections 36 have been omitted in FIGS. 3 and 4 for reasons of clarity. It should furthermore be mentioned that FIG. 3 shows only the shape, but not the exact course of the conductor tracks of a stator receiving coil 22a, 22b, 22c, while parts of the conductor tracks overlap in FIG. 4.

As is evident from FIGS. 3 and 4, each of the stator receiving coils 22a, 22b, 22c has four partial windings 38a, 38b, which substantially cover a circular area (i.e. the inner region 54), divide the circular area into four equally sized areas and/or are symmetrical with respect to the axis S of mirror symmetry. Two partial windings 38a situated opposite in relation to the axis T of symmetry are oriented in a first direction, and the other two partial windings 38b are oriented in the opposite direction, i.e. in an oppositely directed fashion.

In general it holds true that each stator receiving coil 22a, 22b, 22c can have an even number 2 m of partial windings 38a, 38b, and that the measurement range Per of the rotational angle sensor 10, which can be for example an integral divisor of 360°, is dependent on the number 2 m of partial windings 38a, 38b of each stator receiving coil 22a, 22b, 22c, wherein m=360°/Per holds true.

By way of example, the stator receiving coils 22a, 22b, 22c from FIGS. 2 to 4 have four partial windings 38a, 38b. This corresponds to m=2 and results in a periodicity of 180°: Per=360°/m=360°/2=180°.

The same number of partial windings 38a, 38b oriented in one direction and in the other direction has the consequence that the partial voltages induced by the stator transmitting coil 20 (with rotor element 14 absent) compensate for one another in total and 0 V is output as output signal at all the stator receiving coils 22a, 22b, 22c. This can also be used for self-diagnosis, wherein it is possible to recognize that the rotor element 14 is absent or at least has an electrical interruption. Moreover, disturbances on account of EMC influences induce voltages having different signs in each partial winding 38a, 38b, which voltages compensate for one another again as a result of the series connection of the partial winding 38a, 38b.

In the stator element 12, the three stator receiving coils 22a, 22b, 22c are rotated by an angle ξ with respect to one another, which angle can be calculated in accordance with ξ=Per/3 (here for example 60°: ξ=180°/3=60°). This rotation results in a three-phase electrical system having an electrical phase offset of 120°. In the case of a two-phase system (90° electrical phase offset), the coils have to be rotated by ξ=Per/4.

As is evident from FIG. 4, each of the partial windings 38a, 38b is delimited by a radially outer circumferential conductor 40 and a radially inner circumferential conductor 42, which are connected to one another in each case by two radial conductors 44. In FIG. 4, only two of the four radial conductors 44 are discernible for each quadrant (partial windings 38a, 38b) since in each case two radial conductors 44 extend in an overlapping manner one above another in the two planes of the stator printed, circuit board 18. Overall, therefore, eight radial conductors 44 situated in two planes one above another are present in the exemplary embodiment in FIG. 4. Only four radial conductors 44 are thus discernible in FIG. 4. In this case, the circumferential conductor 40 can extend between two radial conductors 44. In this case, the circumferential conductor 40 can be composed of two segments or sections, which can also have a radial portion in relation to the axis T of symmetry. The circumferential conductors 40 are preferably circular path sections, wherein the midpoint of the assigned circles does not coincide with the axis T of symmetry.

The outer circumferential conductor 40 of the first partial winding 38a starts at the point A (also illustrated in FIG. 3) and then extends in the first plane as far as the point B at its center, where it changes plane at a further plated-through hole 37. It subsequently extends in the second plane as far as the point C. At the point C, the outer circumferential conductor 40, extending here in the second plane, is connected to a radial conductor 44, which extends in the second plane as far as the point D, where it transitions to the inner circumferential conductor 42 of the second partial winding 38b.

The inner circumferential conductor 42 of the second partial winding 38b extends from the point. D as far as the point E in the second plane, changes to the first plane at the point F via a plated-through hole 37 and then extends in the first plane as far as the point F, where it transitions to a further radial conductor 44. In this case, the inner circumferential conductor 42 can be composed of two segments or sections, which can also have a radial portion in relation to the axis T of symmetry. The inner circumferential conductors 42 are preferably circular path sections, wherein the midpoint of the assigned circles does not coincide with the axis T of symmetry.

From the point F the further radial conductor 44 of the second partial winding 38a then extends as far as the point A', at which the outer circumferential conductor 40 of the second partial winding 38b begins. A plated-through hole 37 is situated at the point A', at which plated-through hole a change is made to the outer circumferential conductor 40 of the second partial winding 38b in the second plane. In the case of the second partial winding 38b, the changes between the first plane and the second plane then ensue the other way round with respect to the first partial winding 38a at the point B'. Between the points B' and C the outer circumferential conductor 40 extends in the first plane. At the point C the second partial winding 38b once again transitions to a radial conductor 44 and extends with a change of plane from point D to A. The right-hand partial windings follow at the point A.

The outer circumferential conductors 40 extend on circles whose midpoints are displaced from the axis T of symmetry in such a way that the points B at which a plated-through hole 37 is present have maximum radial distance. The inner circumferential conductors 42 extend on the right and left of the respective plated-through hole also on circles whose midpoints are displaced from the axis T of symmetry, but such that the respective plated-through hole have minimum radial distance.

Figure 5:
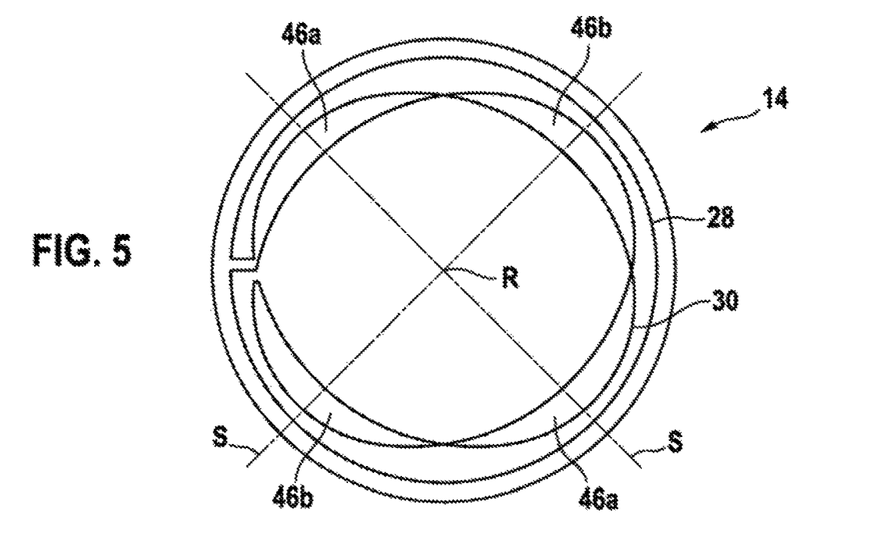
FIG. 5 schematically shows a plan view of a rotor element for a rotational angle sensor in accordance with one embodiment of the disclosure.

FIG. 5 shows a rotor element 14 for the rotational angle sensor 10 from FIG. 1 in plan view, which rotor element comprises a rotor receiving coil 28 and a rotor transmitting coil 30 and can be used together with the stator element 12 from FIGS. 2 to 4.

The rotor receiving coil 28 is substantially circular, wherein the axis R of rotation represents the midpoint of the rotor receiving coil 28. As viewed in a radial direction, the rotor transmitting coil 30 is situated within the rotor receiving coil 28. The rotor receiving coil 28 and the rotor transmitting coil 30 are electrically connected to one another or connected in series with one another by their ends. The rotor receiving coil 28 can extend around the same area as the stator transmitting coil 20 and/or be aligned therewith in relation to the axis R of rotation. Just like the stator transmitting coil 20, the rotor receiving coil 28 can be constructed from a plurality of almost circular conductor tracks.

The rotor transmitting coil 30 has four oppositely directed partial windings 46a, 46b, which are sickle-shaped in each case. The partial windings 46a and 46b respectively situated opposite with respect to the axis R of rotation are oriented in opposite directions with respect to the current flow, while adjacent partial windings 46a, 46b are oriented in opposite directions. The geometries of the partial windings 46a, 46b can be identical. The partial windings 46a, 46b are arranged in an inner region of the rotor receiving coil 28. The two sickle-shaped partial windings 46a, 46b are formed from substantially circular-arc-shaped conductor sections.

Figure 6:
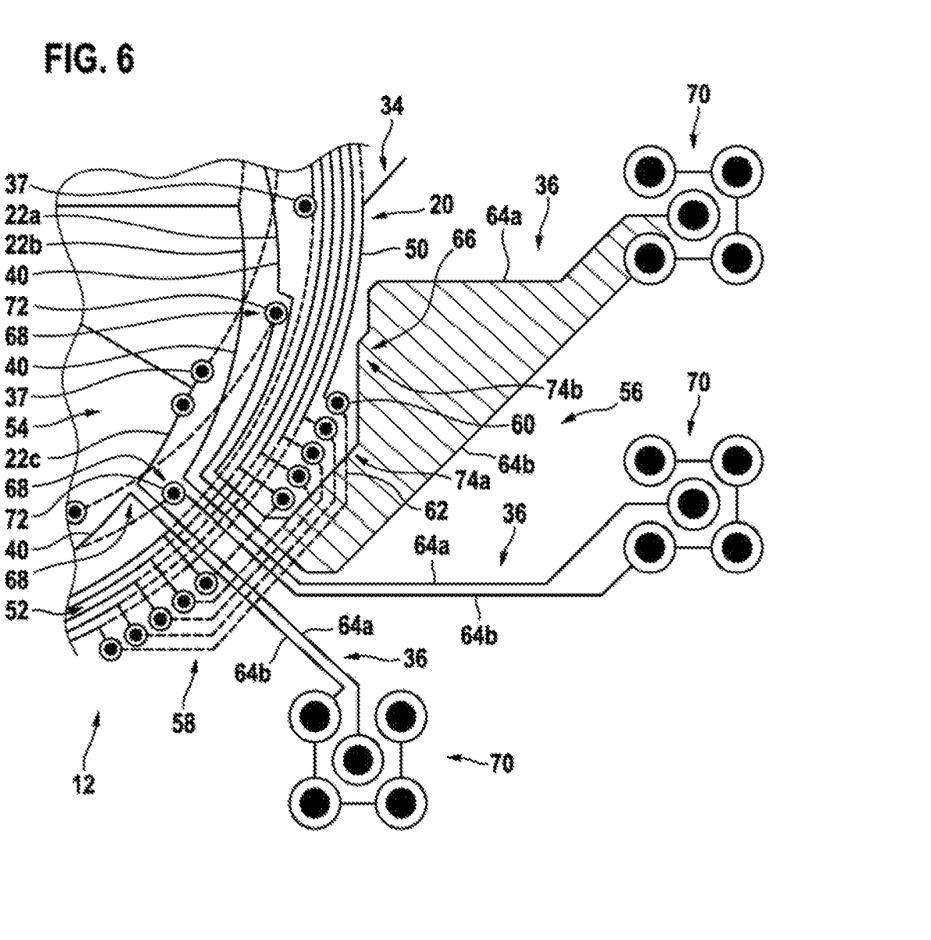
FIG. 6 schematically shows a passage region of a stator element for a rotational angle sensor in accordance with one embodiment of the disclosure.
Figure 7:
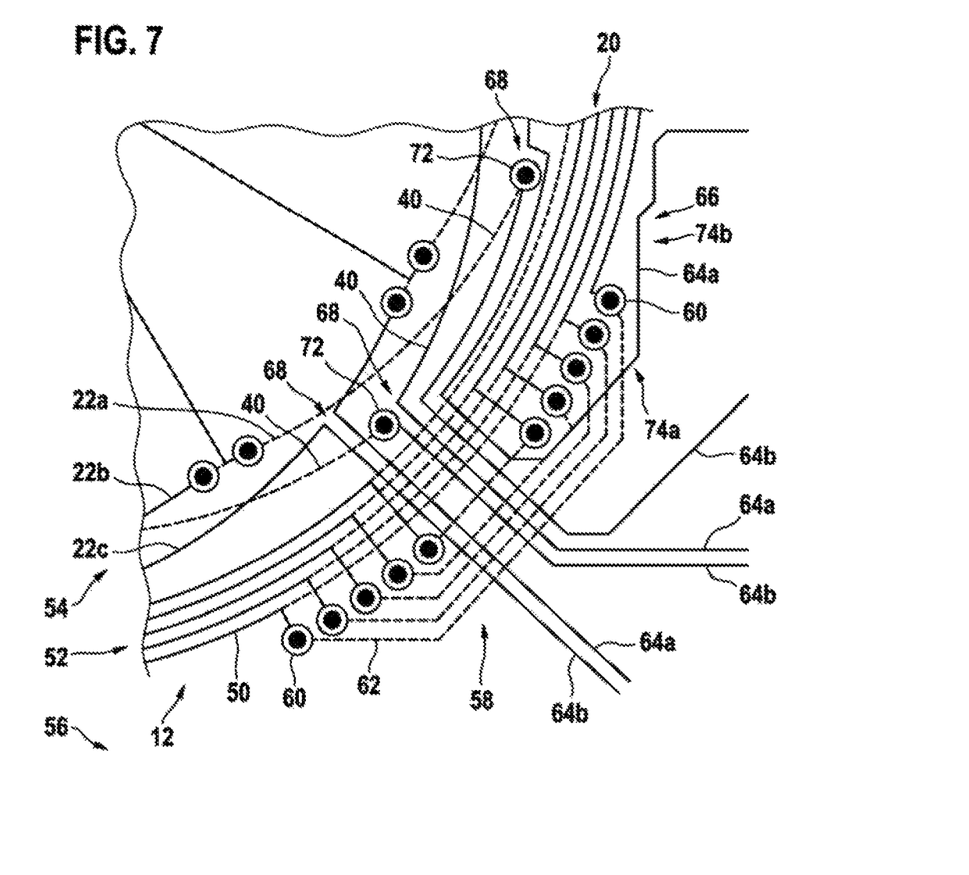
FIG. 7 shows an enlarged excerpt from FIG. 6.

FIG. 6 shows an excerpt from a coil layout for a stator element 12 analogously to FIG. 2. In the case of the stator element 12 in FIG. 6, a connection conductor 64a of a first stator receiving coil 22a is curved to form a conductor loop 66 in order to compensate for an asymmetry in the coil areas of the stator receiving coils. Said asymmetry is brought about primarily by the different area proportions of the areas spanned by the connection conductors 64a, 64b associated with the respective coils.

The two connection conductors 64a, 64b of each stator receiving coil 22a, 22b, 22c are connected to the respective stator receiving coil 22a, 22b, 22c in the inner region 54 of the stator transmitting coil 20 via a respective stator receiving coil connection 68. The stator receiving coil connection 68 can be realized by an interruption of an outer circumferential conductor 40 of the respective receiving coil 22a, 22b, 22c. The two connection conductors 64a, 64b of each stator receiving coil 22a, 22b, 22c extend in the first plane of the printed circuit board 18 and can be connected to a conductor track of the stator receiving coil 22a, 22b, 22c in the second plane via a plated-through hole 72 at the respective stator receiving coil connection 68.

The connection conductors 64a, 64b of each stator receiving coil 22a, 22b, 22c extend substantially parallel to one another from the respective stator receiving coil connection 68 through the passage region 58 to Printed circuit board connections 70 for the stator receiving coils 22a, 22b, 22c. Since the stator receiving coil connections 68 of different stator receiving coils 22a, 22b, 22c are at different distances from the passage region 58 on account of the coil layout of the stator receiving coils 22a, 22b, 22c and the plated-through holes 72, the connection conductors 64a, 64b of different stator receiving coils 22a, 22b, 22c extend to different extents within the stator transmitting coil 20.

This results in different additional areas for each of the stator receiving coils 22a, 22b, 22c, in which additional areas voltages are induced by the stator transmitting coil 20. In the exemplary embodiment illustrated, primarily the first stator receiving coil 22a has longer connection conductors 64a, 64b within the stator transmitting coil 20. Said connection conductors 64a, 64b accordingly also have a larger area than the connection conductors 64a, 64b of the stator receiving coils 22b, 22c, such that an offset voltage of the stator receiving coil 22a would be increased without compensation by the conductor loop 66. In this context, an offset voltage can be understood to mean a voltage which is induced in the stator receiving coils 22a, 22b, 22c in the absence of the rotor element 14. In order to obtain measurement signals that can be evaluated as well as possible, the offset voltages or the offsets of the amplitudes of the stator receiving coils 22a, 22b, 22c should be as small as possible and optimally 0 V.

The asymmetry of the stator receiving coils 22a, 22b, 22c or a balancing of the offset voltage can be compensated for by at least the first stator receiving coil 22a with the largest additional area being connected via the conductor loop 66. A countervoltage with respect to the offset voltage can be induced in said conductor loop 66 by the stator transmitting coil 20.

The conductor loop 66 is formed from the first connection conductor 64a of the first stator receiving coil 22a and forms a first coil area with the section of the first connection conductor within the stator transmitting coil 20 and forms a further, second coil area outside the stator transmitting coil 20 with the second connection conductor 64b. Said further coil area is identified in a hatched manner in FIG. 6. In this case, the coil areas are chosen such that overall a voltage that substantially compensates for the offset voltage is induced in the two coil areas. By way of example, the flux through the second coil area (which corresponds to the coil area multiplied by the field strength) can be identical (apart from the sign) to the flux of the conductor loop formed by the connection conductors 64a, 64b within the stator transmitting coil 20.

Since the direction of the electromagnetic field generated by the stator transmitting coil 20 outside the stator transmitting coil 20 extends oppositely to the field within the transmitting coil 20 and the amplitude outside the stator transmitting coil 20 is generally smaller than within the transmitting coil 20, the conductor loop 66 should be positioned near the transmitting coil 20 and/or extend in the outer region 56 of the transmitting coil 20 oppositely to the section of the first connection conductor 64 within the stator transmitting coil 20.

The conductor loop 66 outside the stator transmitting coil 20 extends outside the stator transmitting coil 20 in a direction opposite to the direction of the section of the first connection conductor 64a within the stator transmitting coil 20. In this case, the conductor loop 66, proceeding from the passage region 58, increases its radial distance with respect to the stator transmitting coil 20 in a first region 74a and decreases its radial distance with respect to the stator transmitting coil 20 again in an adjacent second region 74b. In the two regions 74a, 74b, the conductor loop 66 extends radially outside the plated-through hole 60.

The second connection conductor 64b of the first stator receiving coil 22a extends outside the stator transmitting coil 20 with ever increasing radial distance with respect, to the stator transmitting coil 20 to the printed circuit board connection 70 of the first stator receiving coil 22a.

In the case of the second and third stator receiving coils 22b, 22c, which have shorter connection conductors 64a, 64b of approximately equal length within the stator transmitting coil 20 in the exemplary embodiment illustrated, the connection conductors 64a, 64b, outside the stator transmitting coil 20, too, are relayed at the smallest possible distance from one another in the radial direction, since the electromagnetic field of the stator transmitting coil 20 rapidly decreases radially outward.

In principle, the compensation of an asymmetry within the stator transmitting coil 20 by a connection conductor 64a, 64b extending in a curved fashion outside the stator transmitting coil 20 is also conceivable for more than one stator receiving coil 22a, 22b, 22c, The aim is always to fashion the stator receiving coils 22a, 22b, 22c including their connection conductors 64a, 64b in such a way that an offset voltage is approximately 0 V and the offset is thus reduced in the best possible way.

Finally, it should be pointed out that, terms such as "having", "comprising", etc. do not exclude other elements or steps and terms such as "a(n)" or "one" do not exclude a plurality. Reference signs in the claims should not be regarded as restriction. By way of example, the terms "a connection conductor", "a stator receiving coil", etc. should be understood, to mean synonymously the terms "at least one connection conductor", "at least one stator receiving coil", etc.

The invention claimed is:
1. A rotational angle sensor, comprising:
   a stator element, including:
      a stator printed circuit board having a first plane, and a second plane having diverting tracks;
      a stator transmitting coil having coil conductor tracks in the first plane of the stator printed circuit board and further coil conducting tracks in the second plane of the stator printed circuit board, wherein the coil conducting tracks in the first plane are interrupted so as to form a passage region, and are connected to the diverting tracks on the second plane of the stator printed circuit board via plated-through holes; and
      at least two identically configured stator receiving coils angularly offset relative to each other, and arranged on the stator printed circuit board and within the stator transmitting coil, wherein:
         each of the at least two stator receiving coils has:
            stator receiving coil connections located within the stator transmitting coil; and connection conductors led from the stator receiving coil connections, through the passage region, and to printed circuit board connections for the at least two stator receiving coils;

the connection conductors have different lengths within the stator transmitting coil, such that the at least two stator receiving coils have differently sized coil areas; and one of the connection conductors is curved so as to form a conductor loop that compensates for the differently sized coil areas; and a rotor element mounted rotatably about an axis of rotation relative to the stator element;

wherein the stator transmitting coil is inductively coupled to the at least two stator receiving coils via the rotor element such that the inductive coupling between the stator transmitting coil and the at least two stator receiving coils is configured with reference to a rotational angle between the stator element and the rotor element, so that the stator transmitting coil induces at least two angle-dependent AC voltages in the at least two stator receiving coils.

2. The rotational angle sensor as claimed in claim 1, wherein the one of the connection conductors that forms the conductor loop extends toward the passage region in a circumferential direction within the stator transmitting coil, and extends in an opposite direction outside the stator transmitting coil.

3. The rotational angle sensor as claimed in claim 1, wherein:

the conductor loop, proceeding from the passage region, has:

a first region with an increasing radial distance relative to the stator transmitting coil; and a second portion, adjacent to the first region, with a decreasing radial distance with respect to the stator transmitting coil; and the conductor loop is connected to one of the printed circuit board connections via the second portion.

4. The rotational angle sensor as claimed in claim 1, wherein the plated-through holes for the diverting tracks are arranged radially within the conductor loop.

5. The rotational angle sensor as claimed in claim 1, wherein the connection conductors of one of the at least two stator receiving coils extend parallel from associated stator receiving coil connections through the passage region.

6. The rotational angle sensor as claimed in claim 1, wherein the diverting tracks extend radially outside the coil conductor tracks of the stator transmitting coil in the second plane.

7. The rotational angle sensor as claimed in claim 1, wherein at least one of:

each of the at least two stator receiving coils has at least two oppositely directed partial windings;

each of the at least two stator receiving coils is formed from conductor tracks in the first plane and the second plane of the stator printed circuit board; and conductor tracks of two of the at least two stator receiving coils which are arranged in different planes of the stator printed circuit board cross over each other.

8. The rotational angle sensor as claimed in claim 1, wherein:

the rotor element has a rotor receiving coil and a rotor transmitting coil, electrically connected to each other;

the rotor receiving coil is inductively coupled to the stator transmitting coil such that an electromagnetic field generated by the stator transmitting coil induces a current in the rotor receiving coil that flows through the rotor transmitting coil so that the rotor transmitting coil generates a further electromagnetic field; and the at least two stator receiving coils are inductively coupled to the rotor transmitting coil such that the inductive coupling between the at least two stator receiving coils and the rotor transmitting coil is configured with reference to a rotational angle between the stator element and the rotor element, and such that the further electromagnetic field generated by the rotor receiving coil induces at least two angle-dependent AC voltages in the at least two stator receiving coils.

9. The rotational angle sensor as claimed in claim 8, wherein the rotor transmitting coil is divided into at least two partial windings oriented in opposite directions.

10. The rotational angle sensor as claimed in claim 9, wherein the at least two partial windings of the rotor transmitting coil are configured in sickle-shaped fashion.

* * * * *